United States Patent
Saint-Jean et al.

(10) Patent No.: US 9,215,434 B2
(45) Date of Patent: Dec. 15, 2015

(54) SYSTEMS AND METHODS FOR SESSION RECORDING AND SHARING

(71) Applicants: Felipe Saint-Jean, Santiago (CL); Massimo Scapini, Brooklyn, NY (US)

(72) Inventors: Felipe Saint-Jean, Santiago (CL); Massimo Scapini, Brooklyn, NY (US)

( * ) Notice: Subject to any disclaimer, the term of this patent is extended or adjusted under 35 U.S.C. 154(b) by 19 days.

(21) Appl. No.: 13/754,665

(22) Filed: Jan. 30, 2013

(65) Prior Publication Data

US 2014/0212107 A1    Jul. 31, 2014

(51) Int. Cl.
| | |
|---|---|
| *H04N 5/93* | (2006.01) |
| *G11B 27/00* | (2006.01) |
| *H04N 9/87* | (2006.01) |
| *G11B 27/031* | (2006.01) |
| *G11B 27/10* | (2006.01) |
| *G06F 3/14* | (2006.01) |
| *H04N 9/80* | (2006.01) |
| *H04N 5/92* | (2006.01) |
| *H04N 5/76* | (2006.01) |

(52) U.S. Cl.
CPC ............... *H04N 9/87* (2013.01); *G06F 3/1454* (2013.01); *G11B 27/031* (2013.01); *G11B 27/10* (2013.01)

(58) Field of Classification Search
USPC .......... 386/239, 241, 244, 278, 287, 291, 296
See application file for complete search history.

(56) References Cited

U.S. PATENT DOCUMENTS

| | | | | |
|---|---|---|---|---|
| 5,564,005 | A * | 10/1996 | Weber et al. | 715/863 |
| 6,802,041 | B1 * | 10/2004 | Rehm | 715/201 |
| 2003/0149572 | A1 * | 8/2003 | Newton et al. | 705/1 |
| 2008/0177786 | A1 * | 7/2008 | Faisman et al. | 707/104.1 |
| 2011/0305326 | A1 * | 12/2011 | Poirier et al. | 379/88.13 |
| 2012/0210231 | A1 * | 8/2012 | Ubillos et al. | 715/723 |

* cited by examiner

*Primary Examiner* — Daquan Zhao
(74) *Attorney, Agent, or Firm* — Michael F. Krieger; Kirton McConkie

(57) ABSTRACT

Systems and methods are provided to record and play back computer-based sessions including events and accompanying audio information. Recording computer-based sessions includes recording an event received at a computer device, the event being recorded in a format that does not involve a video screen shot of the event, recording audio information received at the computer device, the audio information being received in temporal proximity to the event, and storing the recorded event and the recorded audio information as a recorded session. Playing a recorded session includes accessing the recorded session, stepping through the recorded session in a time-based fashion while playing any audio information corresponding to a particular time, detecting a recorded event at a particular point in time, and playing back the recorded event in conjunction with any audio information corresponding in time to the recorded event, such that the recorded event is recreated on a playback device.

19 Claims, 7 Drawing Sheets

SYSTEMS AND METHODS FOR SESSION RECORDING AND SHARING

BACKGROUND OF THE INVENTION

1. Field of the Invention

The present invention relates to session recording and sharing, and more particularly to systems and methods for recording and sharing sessions involving computer activity and related audio or audiovisual content.

2. Background and Related Art

With the advent and spread of computers, information is now being spread in new ways. For example, people communicate information that may previously have been communicated by telephone or letter by way of electronic mail, instant messaging, teleconferencing, and the like. While computers and other electronic systems have expanded communications in many ways, they have also complicated the transfer of information and increased the amount of information that must be communicated. As one example, in many instances, it becomes important for computer users to communicate information about their computer systems and their electronic documents and files and other information. For example, a user may wish to communicate information about performance of his or her computer system to a technical support person. Alternatively, a user may wish to utilize information displayed on his or her computer in a presentation to remote individuals and may require that such information be simultaneously displayed on one or more remote systems. A user might also wish to convey complex ideas relating to computer-transmitted information, such as necessary background information relating to computer files and the like. Similarly, users may wish to have access to information presented in a meeting outside of computer-stored data, such as by conversation or the like, including information contained in how things are said. The potential scope of information that may be of interest relating to interaction with computer system is enormous, further enhancing the difficulty in conveying such information in advantageous fashion.

Existing systems and methods have been developed to attempt to facilitate such communication. For example, remote computer access is available to allow a remote user to access a computer system, such as to view information and/or diagnose system problems. As another example, conferencing software and systems may be used to display contents or the display of one computer system to another computer system. Such systems are often used with an audio conferencing feature, many times provided by way of a separate telephone call. As another example, video conferencing has developed to allow one- or two-way communication between remote computer systems.

While existing system and methods provide certain benefits and advantages that are useful for certain needs, they are also limited in their application. For example, while existing conferencing software allows remote users to view what a host user views on his or her computer system while participating in an audio communication among the users, the remote users are limited to static viewing of displayed information and are unable to access underlying data. Similarly, such systems are typically limited to one-time real-time viewing of information and are not well suited for or capable of later use. Other communications systems are limited in the type(s) of information that may be conveyed. Many systems require the transmission of significant amounts of data, such as by transmission of a video feed capturing what is shown on a computer screen, for example. When large amounts of data are to be transmitted, users having slower network connections may not be able to receive all such data in a timely fashion and the users' experience suffers. Consequences of having to convert to video include increased processing power needs, an increased demand for transmission speed and bandwidth, and increased data storage needs. The transmission speed and the storage capacity needed to create a user friendly experience have limited the implementation of such systems.

BRIEF SUMMARY OF THE INVENTION

Implementation of the invention provides systems, methods, and non-transitory computer-readable media containing computer program code for executing methods for recording computer-based sessions including events and accompanying audio information. In certain implementations, a method for recording computer-based sessions includes recording an event received at a computer device, the event being recorded in a format that does not involve a video screen shot of the event, recording audio information received at the computer device, the audio information being received in temporal proximity to the event, and storing the recorded event and the recorded audio information as a recorded session.

The recorded event may be one of a plurality of events recorded at the computer device, where each of the plurality of events is linked to a point in time in the recorded audio information in the recorded session. The method may also include determining that the recorded event involves accessing a file or data and making a determination as to whether to store the accessed file or data with the recorded event in the recorded session. When the accessed file or data is to be stored, the method includes storing the accessed file or data with the recorded session. A determination may be made as to a state of the file or data to be stored with the recorded session, such as a state of the file or data as of the initiation of the recorded session, a state of the file or data as of the termination of the recorded session, or a state of the file or data as of an intermediate point in time between the initiation and the termination of the recorded session.

In some instances, an indication is received that a portion of the session is to be recorded with video screen shot information, and video screen shot information of the computer device is stored with the recorded session during a period of time indicated with the indication that a portion of the session is to be recorded with video screen shot information. The recorded event may be recorded as native data such that upon playback of the recorded session, the recorded event can be replayed at a playback device such that the recorded event is recreated at the playback device. To facilitate interaction with the recorded section, a portion of the recorded session may be tagged.

Implementation of the invention also provides systems, methods, and non-transitory computer-readable media containing computer program code for executing methods for playing a recorded session having recorded audio and recorded events. In certain implementations, a method for playing a recorded session includes accessing the recorded session, stepping through the recorded session in a time-based fashion while playing any audio information corresponding to a particular time, detecting a recorded event at a particular point in time, wherein the recorded event does not include a video screen shot of the recorded event, and playing back the recorded event in conjunction with any audio information corresponding in time to the recorded event, such that the recorded event is recreated on a playback device.

The event may include an access of a file or data, wherein access of the file or data as directed by the event is initiated and a determination made as to whether to interrupt playback of the recorded session to permit the playback device to fully access the file or data. Thus, access may include interrupting playback of the recorded session to permit the playback device to fully access the file or data. In some instances, the user may pause playback of the recorded session and interact with the file or data accessed in the recorded session. In some implementations, the user may be allowed to edit the recorded session to create a new recorded session. In certain circumstances, the user may also be allowed to save a file or data in its then-displayed format.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

Figure 1:
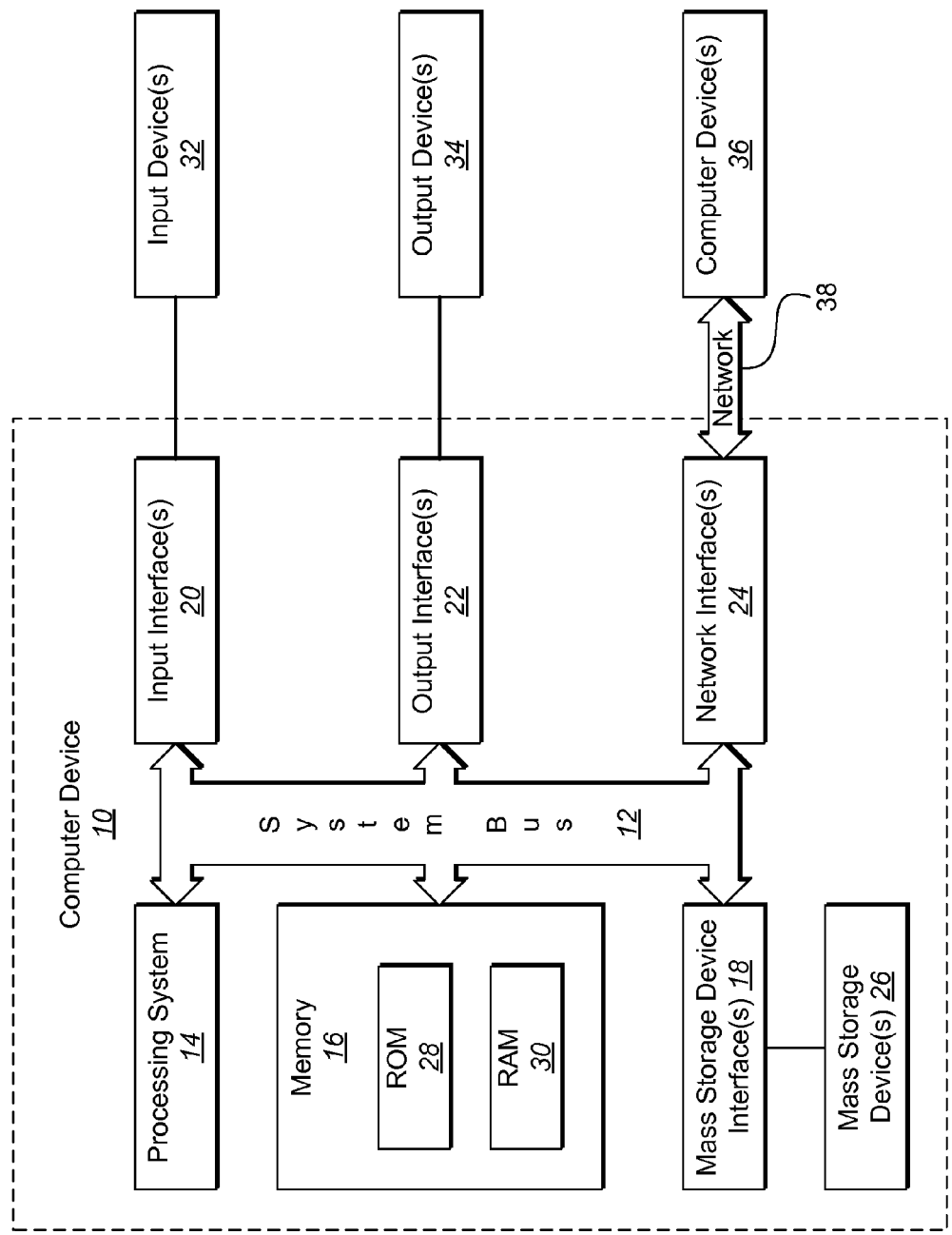
FIG. 1 shows a representative computer system for use in conjunction with embodiments of the invention.

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

Embodiments of the invention provide systems, methods, and non-transitory computer-readable media containing computer program code for executing methods for recording computer-based sessions including events and accompanying audio information. In certain embodiments, a method for recording computer-based sessions includes recording an event received at a computer device, the event being recorded in a format that does not involve a video screen shot of the event, recording audio information received at the computer device, the audio information being received in temporal proximity to the event, and storing the recorded event and the recorded audio information as a recorded session.

The recorded event may be one of a plurality of events recorded at the computer device, where each of the plurality of events is linked to a point in time in the recorded audio information in the recorded session. The method may also include determining that the recorded event involves accessing a file or data and making a determination as to whether to store the accessed file or data with the recorded event in the recorded session. When the accessed file or data is to be stored, the method includes storing the accessed file or data with the recorded session. A determination may be made as to a state of the file or data to be stored with the recorded session, such as a state of the file or data as of the initiation of the recorded session, a state of the file or data as of the termination of the recorded session, or a state of the file or data as of an intermediate point in time between the initiation and the termination of the recorded session.

In some instances, an indication is received that a portion of the session is to be recorded with video screen shot information, and video screen shot information of the computer device is stored with the recorded session during a period of time indicated with the indication that a portion of the session is to be recorded with video screen shot information. The recorded event may be recorded as native data such that upon playback of the recorded session, the recorded event can be replayed at a playback device such that the recorded event is recreated at the playback device. To facilitate interaction with the recorded section, a portion of the recorded session may be tagged.

Embodiments of the invention also provide systems, methods, and non-transitory computer-readable media containing computer program code for executing methods for playing a recorded session having recorded audio and recorded events. In certain embodiments, a method for playing a recorded session includes accessing the recorded session, stepping through the recorded session in a time-based fashion while playing any audio information corresponding to a particular time, detecting a recorded event at a particular point in time, wherein the recorded event does not include a video screen shot of the recorded event, and playing back the recorded event in conjunction with any audio information corresponding in time to the recorded event, such that the recorded event is recreated on a playback device.

The event may include an access of a file or data, wherein access of the file or data as directed by the event is initiated and a determination made as to whether to interrupt playback of the recorded session to permit the playback device to fully access the file or data. Thus, access may include interrupting playback of the recorded session to permit the playback device to fully access the file or data. In some instances, the user may pause playback of the recorded session and interact with the file or data accessed in the recorded session. In some embodiments, the user may be allowed to edit the recorded session to create a new recorded session. In certain circumstances, the user may also be allowed to save a file or data in its then-displayed format.

FIG. 1 and the corresponding discussion are intended to provide a general description of a suitable operating environment in which embodiments of the invention may be implemented. One skilled in the art will appreciate that embodiments of the invention may be practiced by one or more computing devices and in a variety of system configurations, including in a networked configuration. However, while the methods and processes of the present invention have proven to be particularly useful in association with a system comprising a general purpose computer of any of a variety of types as discussed below, embodiments of the present invention include utilization of the methods and processes in a variety of environments, including embedded systems with general purpose processing units, digital/media signal processors (DSP/MSP), application specific integrated circuits (ASIC), stand alone electronic devices, and other such electronic environments.

Embodiments of the present invention embrace one or more computer-readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer-readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), solid-state drives and devices, flash drives and devices, or any other device or component that is capable of providing data or executable instructions that may be accessed by a processing system. While embodiments of the invention embrace the use of all types of computer-readable media, certain embodiments as recited in the claims may be limited to the use of tangible, non-transitory computer-readable media, and the phrases "tangible computer-readable medium" and "non-transitory computer-readable medium" (or plural variations) used herein are intended to exclude transitory propagating signals per se.

With reference to FIG. 1, a representative system for implementing embodiments of the invention includes computer device 10, which may be a general-purpose or special-purpose computer or any of a variety of consumer electronic devices. For example, computer device 10 may be a personal computer, a notebook computer, a netbook, a tablet computer such as the iPad® manufactured by Apple or any of a variety of Android™-based tablet computers produced by multiple manufacturers, a personal digital assistant ("PDA") or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer-readable media, such as on memory 16, a solid-state drive, a flash drive, a magnetic hard disk, a removable magnetic disk, a magnetic cassette, an optical disk, or from a communication connection, which may also be viewed as a computer-readable medium.

Memory 16 includes one or more computer-readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include solid-state drives, flash drives, hard disk drives, magnetic disk drives, tape drives and optical disk drives. A mass storage device 26 may read from and/or write to a magnetic hard disk, a removable magnetic disk, a magnetic cassette, an optical disk, or another computer-readable medium. Mass storage devices 26 and their corresponding computer-readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, touch screen, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), an integrated circuit, a Firewire® (IEEE 13114), or another interface. For example, in some embodiments input interface 20 includes an application specific integrated circuit (ASIC) that is designed for a particular application. In a further embodiment, the ASIC is embedded and connects existing circuit building blocks.

One or more output interfaces 22 may be employed to connect one or more corresponding output devices 34 to system bus 12. Examples of output devices include a monitor or display screen, a speaker, a printer, a multi-functional peripheral, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, such as a cloud-based computer environment, where functions or tasks are performed by a plurality of networked computer devices.

Figure 2:
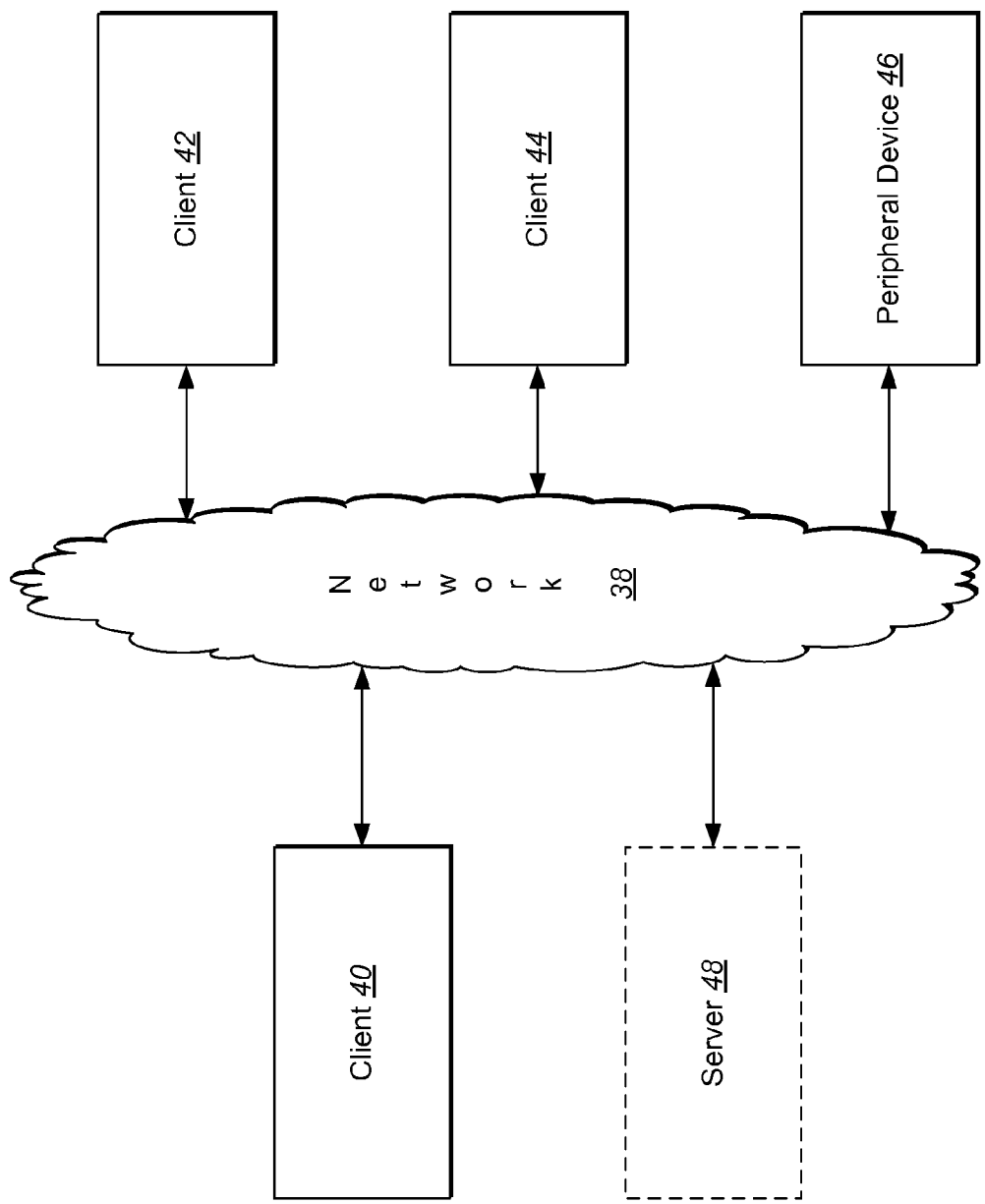
FIG. 2 shows a representative networked computer system for use in conjunction with embodiments of the invention.

Thus, while those skilled in the art will appreciate that embodiments of the present invention may be practiced in a variety of different environments with many types of system configurations, FIG. 2 provides a representative networked system configuration that may be used in association with embodiments of the present invention. The representative system of FIG. 2 includes a computer device, illustrated as client 40, which is connected to one or more other computer devices (illustrated as client 42 and client 44) and one or more peripheral devices (illustrated as multifunctional peripheral (MFP) MFP 46) across network 38. While FIG. 2 illustrates an embodiment that includes a client 40, two additional clients, client 42 and client 44, one peripheral device, MFP 46, and optionally a server 48, which may be a print server, connected to network 38, alternative embodiments include more or fewer clients, more than one peripheral device, no peripheral devices, no server 48, and/or more than one server 48 connected to network 38. Other embodiments of the present invention include local, networked, or peer-to-peer environments where one or more computer devices may be connected to one or more local or remote peripheral devices. Moreover, embodiments in accordance with the present invention also embrace a single electronic consumer device, wireless networked environments, and/or wide area networked environments, such as the Internet.

Similarly, embodiments of the invention embrace cloud-based architectures where one or more computer functions are performed by remote computer systems and devices at the request of a local computer device. Thus, returning to FIG. 2, the client 40 may be a computer device having a limited set of hardware and/or software resources. Because the client 40 is connected to the network 38, it may be able to access hardware and/or software resources provided across the network 38 by other computer devices and resources, such as client 42, client 44, server 48, or any other resources. The client 40 may access these resources through an access program, such as a web browser, and the results of any computer functions or resources may be delivered through the access program to the user of the client 40. In such configurations, the client 40 may be any type of computer device or electronic device discussed above or known to the world of cloud computing, including traditional desktop and laptop computers, smart phones and other smart devices, tablet computers, or any other device able to provide access to remote computing resources through an access program such as a browser.

According to embodiments of the invention, a computer device is used to record a session involving the computer device. Recording of the session involves recording audio or audiovisual data while simultaneously recording events occurring at the computer device. With at least some embodiments, the audio or audiovisual recording may receive and record audio information from more than one user (e.g. from multiple users sitting proximate a computer device), but the recorded events are all received at a single computer device. The recording of events at the computer device may occur in part by way of recording and storing a static and/or video screen shot of the computer device's display screen; however, because video data can quickly result in large amounts of stored data that must be accessed and/or transmitted for playback of a recorded session, in many instances there is no recording of a video screen shot of the computer device. Instead, the events recorded at the computer device are recorded and stored as native events and data wherever possible.

Any of a variety of events may be detected, recorded, and stored. For example, where the computer device has a physical or virtual keyboard, selection of a key or keys of the keyboard may be recorded as an event. Similarly, if a mouse, touchscreen, or other pointing device is used to move a pointer on the screen of the computer device, the movement of the pointer may be recorded as an event. When a selection (such as a mouse click, tap of a touch screen, etc.) of an element or file is received at the computer device, the selection may be recorded as an event. The activation of a file may be recorded as an event. The modifying of a file may be recorded as an event. The saving of a file may be recorded as an event. Switching between windows, modifying the size or relationship of one or more windows, opening windows, closing windows, and the like may all be recorded as events. Thus, essentially any user interaction with the computer device may be recorded as events. Where static screen shots and/or video-type capture of the screen or other view of the computer device occurs, the events may be captured at least in part by way of the screen shots or video, but in all possible cases, the events are recorded (or are also recorded) as native data. That is to say, the events are recorded in such a way that the events can be recreated at a later time using underlying native data.

Thus, for example, if an event or series of events includes the entry of a string of text data through a keyboard (physical or virtual), the entry of the string of text data is recorded in a way that entry of the same string of text data may be effectuated on a playback computer device at a later time, when the session is being replayed, including at a proper location in a document, window, or screen. If entry of a drawing, doodle, or handwritten note is received at the computer device, such as by way of a touch screen, stylus, mouse, or other pointing device, the entry of the drawing, doodle, or handwritten note is received, recorded, and stored as a time-and-position-based recordation of the entered line data such that a similar time-and-position-based drawing, doodle, or handwritten note may be recreated on the playback computer device. If a command is received to switch windows or open another window, the command may be recorded such that upon playback, the playback computer also switches windows or opens the commanded window.

Similarly, if a file is selected by a pointing device and the selection of the file is recorded as an event, the event is recorded as selection of the file such that upon playback of the session, the same file can be selected. If a file is modified during a session, the modification events are recorded such that identical modifications of the file can be effectuated at the playback computer device. Thus, essentially any computer action can be recorded in a way such that the same or a substantially-equivalent computer action can be effectuated at the playback computer device during playback of the recorded session.

As such actions may involve interactions with various programs, windows, files, and the like, the events may be recorded in ways that permit similar interactions with identical or similar programs, windows, files, and the like on a playback computer device. As an example, if a recorded session includes recording of actions relating to opening, viewing, or interacting with a webpage using a browser, the events may be recorded such that playback involves opening, viewing, or interacting with a version of the webpage loaded at the time of playback on the playback computer device. In some such instances, the recorded session need not obtain and include the website content, instead allowing the playback computer device to obtain the website content directly at the time of playback. Similarly, playback of the recorded session need not necessarily utilize an identical web browser program, as many web browsers function and display web pages similarly.

In other instances, such as where a concern exists that the content of the web page may change between the time of recording of the session and the time of playback of the session, some or all of the content of the web page that is opened, viewed, or interacted with can be obtained as part of the recording process and can be used during playback to ensure that the playback experience properly mimics the conditions at the time of recording the session. The information so obtained may be obtained and recorded in intelligent ways to facilitate the playback experience and/or minimize stored data. For example, the recording program may download or otherwise obtain copies of all content displayed on the web page and store such content for later display. Alternatively, the recording program may avoid downloading certain non-essential content, such as advertising content, which may be detected in any of a variety of ways. Thus, the recording program might only download textual, layout, and graphic data that is not advertising in nature.

As another alternative, the recording program may only download textual and layout information, along with access information for other information such as graphical-intensive information. In many instances, a web page may be modified so as to no longer refer to or include, for example, a particular image, movie, or the like; however, such content oftentimes remains accessible at the same location where it was previously accessed through the web page. Thus, playback of the recorded session in this example involves loading the textual and layout information stored with the recorded session, and attempting to obtain or download the other information (e.g. pictures and/or video) from the web-accessible location where it was previously hosted. While not all such attempts may be successful, especially as time passes between recording and playback, the reduction in stored data may be a sufficient accomplishment to merit this method and similar methods of recording and playback.

As another alternative, which may be used in conjunction with the alternatives discussed above or independently, the recording program may store screen captures of the web browser view at the time of selected types of events. For example, one event of common interest when interacting with web browsers is the event of clicking on or otherwise selecting a particular link or other screen element. At the time of receipt of such an event, the recording program might optionally obtain a screen or window capture, and during playback, the screen or window capture could be displayed to the playback user to ensure that the playback user understands what was being viewed at the time of selection of the link or other screen element. Such a procedure ensures that the playback user is able to view exactly what was visible at the recording device at important points of time and events, but at a relatively-low cost in terms of stored and/or transmitted data. During playback, such screen shots may be displayed as a sort of temporary slide show from event to event, or may be displayed on a temporary basis (such as for a few seconds) after playback of an applicable event.

Embodiments of the invention may utilize a variety of these methods and/or various combinations of these methods at different times. In some instances, the method of recording may be varied within an individual session. For example, if the user recording a session knows that a particular web page viewed during a session is subject to frequent change and knows that the exact view is important, the user may opt permanently or temporarily to utilize a recording format that will preserve and display the exact view to the user. If a different web page is not typically subject to change or to much change, the user may opt to record using a less data-intensive method and to rely on the playback computer device obtaining the original data from the source web page at the time of playback.

Of course, it will be understood that use of and among the above-described and similar methods may be selected and varied according to the expectation of whether the playback computer device will be connected or connectable to the Internet and able to obtain information from the web page at the time of playback. Thus, if it is anticipated that no such connection will be available at the time of playback, a method that obtains and stores more data with the recording of the session may be utilized.

As recorded actions and events may involve the selection and/or modification of one or more files, it will be recognized that playback of events involving selection and/or modification of files involves the existence, however temporary, of such files on the playback computer system, along with programs capable of accessing and interacting with such files on the playback computer system or device. Alternatively or as backup for instances where the files or programs capable of accessing and interacting with the native files are not available on the playback computer system, the existence of static or video screenshots of the views of the files may be utilized.

In many instances, existence of programs necessary to access and interact with the files may be presumed. For example, recording and playback of a session may be utilized to allow users to collaborate on and work with a draft document in ways heretofore unavailable. In such an instance, both users will typically have a program capable of accessing and interacting with a file or files of interest. Thus, one user might send a draft of the file to the other user, who wishes to provide feedback to the other user. However, the users may be in very different time zones, may have varying levels of access to communications that would permit real-time communication between the users about the draft and desired changes, or may have other commitments that prevent them from directly collaborating within a desired timeframe using conventional communications mechanisms.

Embodiments of the invention allow the user making edits to the document to communicate edits, changes, and other information simultaneously in ways not previously available. While standard practice in many instances allows changes to a document to be viewed after the fact (such as by the "Track Changes" feature of Microsoft Word), embodiments of the invention allow much more information to be conveyed. Not only are the changes recorded as events, but audio provided by the editing user is simultaneously recorded, and other types of interaction such as touch-based events (finger swipes corresponding to underlining or highlighting, doodles or handwritten notes, and the like) may be input and recorded that cannot be conveyed using existing programs' traditional change-tracking features. The recordation of such audio and events allows the user to convey information about the edits, including reasoning behind the edits and the like orally or otherwise for playback at the time the edits are being reviewed. Additionally, the user may convey any other information to be orally transmitted, including passing thoughts that might otherwise be forgotten, thoughts about additional edits for consideration that are not shown in the changes to the document, and even other information including trivialities such as jokes or other information not related to the document being reviewed and edited.

While the simultaneous recording of audio information greatly increases the information that may be conveyed through recording of a session, recording of a session as described above including the recording of events and audio or audiovisual data allows embodiments of the invention to convey information that is not normally conveyed using normal change tracking features of typical software. For example, typical change tracking features only show changes between an initial state and a final state, and do not show intermediate changes or changes that were made and then unmade. For example, if an editing user is working on a document, the editing user may believe that a change is necessary in the document at a particular location, and may or may not orally comment on such as he or she enters the change to the document. As the editing user proceeds, he or she might find additional information causing the user to change his or her mind as to the need for the original edit and may therefore go back and delete it. With standard change tracking software, the original edit would typically be lost; however, with embodiments of the invention, when the session is played back, the original edit can be seen such that the recipient of the edited document might become aware of a potential problem with the document that was not necessarily noted in the final edited version of the document. Even if the editing user did not keep the edit, the edit is viewable in the recorded session and additional information is conveyed to the viewer.

Similarly, a user reviewing a document may decide to make an edit of a document, and may try several different edits of a section before making a final edit. For example, a reviewing user may struggle to find just the right wording for a section of the document. With standard change tracking features, all attempts at editing before the final edit are lost. With embodiments of the invention, however, all edit attempts are saved and are viewable with playback of the session. Thus, the user viewing the session can see what attempts were made before the final edit, whether or not audio information accompanies the edits, along with the final edit. The viewing user can then use the various editing attempts in conjunction with the final edit as input to arrive, potentially, at an even better edit of the document. Thus, embodiments of the invention greatly facilitate collaboration, review, and similar efforts in ways not currently available.

As discussed above, embodiments of the invention record events relating to one or more files, including the selection of files, opening files, modifying files, and the like. As such, and as mentioned above, playback of sessions may involve similar actions relating to files. While much of the information conveyed in the recorded session could potentially be conveyed by way of static or video screen captures, there are several potential disadvantages of such methods. First, such methods often result in capture of large amounts of data, which may result in the size of the recorded session becoming undesirable or even impossible to transmit to other users for playback. Second, such methods typically fail to provide access to the underlying data or files. Embodiments of the invention address these concerns.

According to embodiments of the invention, the need to render or convert to a video capture or view is essentially avoided in many, most, or all instances. As discussed above, static or video screen shots may optionally be used from time to time as necessary or desirable to supplement other methods discussed herein, such as when there is no ability to access programs necessary to view native data (e.g. documents through a document viewer and the like). At least some embodiments of the invention, however, preserve and provide access to the underlying data, which is made available on the playback computer system or device, such as using native programs. As native data is accessed and utilized during playback of a session recording using native programs, embodiments of the invention embrace the inclusion of accessed files in the recorded session.

Thus, a recorded session may include (1) recorded events, some or all of which may be recorded in a native format such that they may be natively repeated on a playback computer device or system; (2) recorded audio and/or audiovisual data, such that the recorded events can be played back in conjunction with associated audio and/or audiovisual data; and (3) additional data and/or files associated with the recorded events. Thus, for example, a recorded session may include events and audio data, as well as one or more files that were accessed during the recorded session. As discussed above with respect to the document review process example, the recorded session may include the file or other document under review. Files and other data that are to accompany the recorded session may be saved as separate files that are individually sent to accompany the session recording, or they may be saved as part of a file bundle that includes the recorded session. Where the files and other data form a part of the recorded session bundle, the bundle may be saved and transmitted as a single file, which is accessed by the playback program on the playback computer device to provide access to the recorded session and the accompanying file(s) or other data. The file bundle may have a specialized file format configured for use in association with embodiments of the invention.

It will be appreciated that when files are merely accessed and are not modified, the files included as part of the recording session, whether as part of a file bundle or individually, are simply files stored in the format, state or condition (collectively "format") in which they existed during recording of the session. In instances where the files are modified during the recorded sessions, however, the files included in the recorded sessions should be included in a way that permits accurate playback of the recorded session. In one type of embodiment, the files are saved in their initial formats and the recorded events relied upon to show modifications of the files during playback of the session. In another type of embodiment, the files are saved in their final formats and the recorded events are parsed and relied upon to regenerate the files to their original or intermediate formats (depending on the location of playback). In another type of embodiment, the files may be saved in some intermediate format. In another type of embodiment, the files may be saved in more than one format. In some embodiments, the files may be saved at formats/points selected by the user making the recording.

The saving of files and data in native formats provides powerful additional benefits not obtainable using existing methods and systems. For example, in at least some embodiments of the invention, playback of a session can be interrupted and a file being accessed in the playback can be saved out of the playback program in its then-current state. Additionally, the native data is readily accessible in its then-current format, and can be accessed using any available native accessing and editing tools, such as copy and paste, zoom, and the like. Similarly, because the session is recorded using native data, a collaborative recorded session may be generated in at least some embodiments such that a user viewing a recorded session can suspend playback of the session and can insert his or her own recorded session into the existing recording with feedback on the original recorded session that can in turn be played back at later times by that user or by other users.

When a multi-user multi-recording recorded session is generated in this fashion, the events and data input by the second user can be recorded and saved in similar fashion to those methods discussed above. The effects of such events can have varied effects on the remainder of the recorded session depending on the embodiment and potentially the desires of the user. In one example, the recording inserted into the original recording has little to no effect on the remainder of the recording, other than being selectively viewable. Thus, in this example, if the user inputs additional annotations or notes to a document, such annotations or notes would be viewable during the portion of the recording made by the second user, but would disappear when playback of the recorded session returns to the portion made by the first user. In a second example, the effect of events recorded during the second recorded session made by the second user could be propagated so as to affect or remain in the remaining portion of the recorded session. Thus, upon later view of the edited recorded session, annotations or notes made by the second user would be made during playback and would remain visible throughout the recorded session. As another example, whether events recorded by the second user are propagated to the remainder of the session, or even whether the portion of the recorded session made by the second user is viewed during playback could be user-selectable such that playback may be customized as desired. Thus, a subsequent user could have the original playback experience, a playback experience modified by the second user's input, or a playback experience having some combination thereof.

Figure 3:
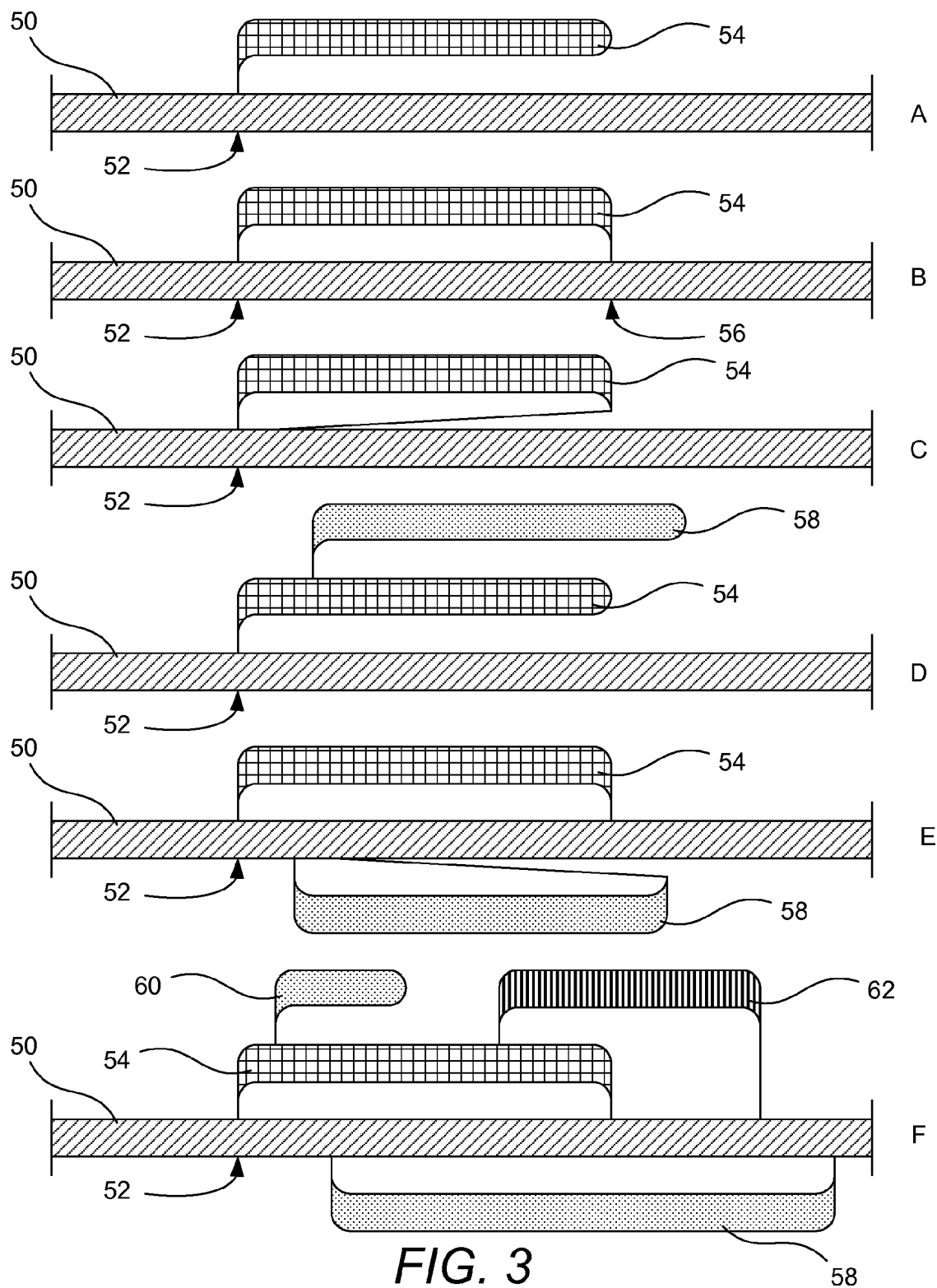
FIG. 3 shows representative timelines illustrative of methods for creating and playing back collaborative sessions.

FIG. 3 graphically illustrates representative timelines of a collaborative session and reference to the illustrations of FIG. 3 will be used to discuss representative manners in which a collaborative recorded session may be generated and/or consumed. The illustrations of FIG. 3 and the corresponding discussion are intended to assist in understanding representative creation, modification, and consumption of collaborative session, and should not be deemed the only ways to create, modify, and consume such sessions.

FIG. 3 shows six examples of representative sessions illustrated with timelines, the representative sessions labeled A, B, C, D, E, and F. Each collaborative session includes a baseline session 50. The baseline session 50 is recorded by a first user as has been discussed previously and as will be illustrated in more detail in FIGS. 4 and 5 below. The baseline session 50 may include any features of recorded sessions discussed herein. In FIG. 3, the baseline session 50 is illustrated as a timeline in which left-to-right horizontal movement along the timeline corresponds to consumption or playback of the baseline session 50 by a later user. The baseline session 50 may include recorded input from a single user or may include input from multiple users. For purposes of this discussion, the baseline session 50 may even be a branching or collaborative session as will be discussed with respect to FIG. 3.

At a time after the baseline session 50 has been generated, a user accesses the baseline session 50. The user may be the original user who created or assisted in creating the baseline session 50, or the user may be a different user. The user plays back the recorded session to a certain point in time or otherwise navigates to a point in time illustrated as point in time 52. At point in time 52, the user decides to make a collaborative addition to the baseline session 50. For example, if the baseline session 50 relates to reviewing and editing a document, the user may decide to make his or her own comments or annotations to a document such that later consumers of the recorded session can see his or her comments or annotations in addition to those contained in the baseline session 50. Therefore, the user may opt to record a second session 54 beginning at point in time 52.

In one embodiment, playback of the baseline session 50 is paused while the second session 54 is being recorded. In such an embodiment, the second session 54 may later be consumed in a similar fashion, with playback of the baseline session 50 paused at the point in time 52 while the second session 54 is consumed. After playback of the second session 54 is complete, playback of the baseline session 50 may resume. When playback of the baseline session 50 resumes, any additions made as a result of the second session 54 may be treated in any of a variety of ways.

In one option, any additions made to the file, display, data, etc. of the baseline session 50 by the second session 54 are maintained as part of the continued playback of the baseline session 50. For example, if the baseline session 50 involves annotating and commenting on a word processing document, the second session 50 might involve making annotations to the word processing document that complement annotations made up to the point in time 52. Those annotations might remain in the word processing document (or at least the display thereof) as playback of the baseline session 50 resumes.

As another option, any additions made to the file, display, data, etc. of the baseline session 50 by the second session 54 are removed or ignored once playback of the second session 54 terminates and playback of the baseline session 50 resumes. Thus, returning to the example of a word processing document, annotations to the word processing document made during the second session 54 may be ignored and removed as playback of the baseline session 50 resumes.

As another option, the system may keep a portion of the additions made in the second session 54 and may discard another portion of the additions made in the second session 54 as playback of the baseline session 50 resumes. For example a determination may be made as to possible conflicts between the additions made in the second session 54 and later additions in the baseline session 50 that would not make sense in light of additions in the second session 54. In the event of such conflicts, the system may discard additions from the second session 54 determined to result in conflicts.

Regardless of how any additions of the second session 54 are handled upon resumption of playback of the baseline session 50, the manner of handling the additions may be governed or determined in any of a variety of fashions. As one example, the creator of the baseline session 50 may create settings that ensure that any additions made by the second session 54 are ignored or kept. Similarly, the creator of the second session 54 could create similar settings. Alternatively, a user playing back the baseline session 50 as modified by the second session 54 could input instructions to the system controlling handling of the additions of the second session 54. Another option would be some sort of hybrid of any of the previous options.

In the example labeled A in FIG. 3, the second session 54 may be configured to return playback to the point in time 52, which is the same point in time where playback of the baseline session 50 stops for playback of the second session 54. Thus, when the second session 54 is fully played back, it acts as an expansion of the baseline session 50, which is effectively lengthened accordingly. Embodiments of the invention are not limited to this type of expansion, however, and examples B and C in FIG. 3 show alternative options.

In the example labeled B of FIG. 3, the second session 54 may be interpreted as operating in one of two fashions. In a first example, the second session 54 serves as an alternate session that can be played back in lieu of a portion of the baseline session 50. Thus, when playback of the second session 54 occurs (either by setting or by selection of the playback user), playback of the second session 54 begins at the point in time 52. Playback of the second session 54 ends at a second point in time 56, and playback of the baseline session 50 resumes at the second point in time 56. In this example, playback of the portion of the baseline session 50 between the point of time 52 and the second point in time 56 does not occur.

In a second example, the second session 54 serves as a concurrent session such that playback of the second session 54 and playback of a corresponding portion of the baseline session 50 occur simultaneously. A viewer viewing the collaborative session may experience a unique played back session experience that simulates having multiple participants acting together even though recording of the baseline session 50 and the second session 54 were separated in time.

The example labeled C in FIG. 3 illustrates how upon completion of playback of the second session 54, playback of the baseline session 50 may occur at any desirable point in time. Indeed, playback of the baseline session 50 may resume at the same time location as illustrated in example A, at a later location corresponding in the passage of time to the length of the second session 54 as illustrated in example B, or at any different time selected by any user (e.g. either the user recording the second session or a user playing back the collaborative session), as is illustrated in example C. While examples A-C shown in FIG. 3 illustrate a single comparatively-lengthy second recording 54, it should be understood that a second user could append multiple short additional sessions to the baseline session 50, and each additional session could be handled identically or differently from one another in any of the ways discussed herein or in any other fashion for handling multiple sessions as a unified collaborative session for playback.

Examples D-F are intended to illustrate that a collaborative session may be crafted from inputs of multiple users in an ongoing collaboration. Example D is substantially similar to example A, but another user has appended a third session 58 to the collaborative session of example A. The third session 58 may be of any type of session discussed herein, and may be played back in any desirable fashion as discussed herein. Specifically, example D shows an example where the third session 58 modifies the second session 54 and returns playback of the second session 54 to the location where playback of the third session 58 began.

Example E shows that the third session 58 may be based off of the baseline session 50, and may have a variety of relationships to the second session 54. For example, different users could independently create the second session 54 and the third session 58 of example E independently (e.g. based solely on versions of the collaborative session containing only the baseline session 50). Their collective efforts might later be merged to create the final collaborative session. As another example, a user could view the collaborative session formed by the baseline session 50 and the second session 54 and determine to add the third session 58 as a separate option to be played back with or without the second session 54. The presence of multiple sessions as illustrated by examples D and E provide multiple options for playback of the collaborative session.

The final example of FIG. 3 is intended to show how a collaborative session created by multiple users could grow over time. In this example, the collaborative session might first be created by a user creating the baseline session 50. The first user sends the baseline session to a second user, who adds the second session 54 and passes the combined collaborative session to a third user. The third user adds the third session 58, which is based on or tied to the baseline session 50, but also adds a fourth session 60 tied to the second session. The third user then passes the collaborative session back to the first user, who decides to add a fifth session 62 and then redistributes the sessions to all participating users. The combined effect is a complex creation that combines multiple inputs from multiple users. A collaborative session may be far more complex than can be readily represented and discussed on a single page such as shown in FIG. 3, but FIG. 3 illustrates many of the concepts of embodiments of collaborative sessions. Each later-added session serves as a part of or a comment on the original session or the previous iteration of the collaborative session.

While FIG. 3 is intended to show functionality of interacting sessions, it also serves to illustrate a representative display that might be provided to a user consuming a collaborative session. For example, the user could view a display such as those shown in FIG. 3 to determine who has made edits or comments on the session. Such a display could be used for navigation purposes. Additionally, a consuming user could determine whether to play back all parts of the collaborative session or only certain subparts. As collaborative sessions formed by the inputs of various users can grow quite complex, it can be important to minimize the amounts of data that may be shared with each iteration.

For example, adding additional parts to a collaborative session may not require addition of and re-transmittal of the underlying data. If example A shown in FIG. 3 is a collaborative session relating to a word processing document, the second session 54 makes modifications, annotations, or the like to the version of the document as modified by the actions of the baseline session 50 up to the point in time 52. That said, because the underlying word processing document is available and transmitted or otherwise provided in its native format, a modified version of the word processing document itself need not be retransmitted. Instead, the native data of the changes is stored as part of the second session 54 so that appropriate additions, annotations, or the like to the word processing document can be made to the native document as part of playback of the collaborative session. Indeed, where the baseline session 50 is available at a location where the second session 54 is to be made available, the baseline session 50 need not be reconveyed, further reducing the data cost of providing collaborative sessions as discussed herein. These are only a few of the ways that embodiments of the invention reduce data costs of sharing information.

Recording of sessions by way of recording events as described above and utilizing and saving native data and files where possible typically greatly reduces the amount of data that must be conveyed for playback of a recorded session. This provides significant advantages over existing systems such as online meetings that rely primarily on the transmission of video screen capture data and the like, which involves the use of significant amounts of bandwidth and transmission of much data. While it may be desirable to avoid the use of video capture in many instances, certain embodiments of the invention may utilize video capture where necessary or upon command by the user. For example, if video or still screen capture is desired or to be offered, a recording program may provide controls that may be selected to capture static or video screen captures for inclusion in the recorded session. Thus, embodiments of the invention may provide significant amount of flexibility of use, and may mimic and/or provide the benefits of existing systems in many regards while providing significant additional benefits as discussed herein.

As discussed previously, events and audio and/or audiovisual data are recorded when a session is recorded. Such events and data are time synchronized to generate a playback experience that reflects the experience of the user recording the session. Certain events that are recorded include little to no time component. For example, events such as reception of at least some mouse clicks or the like have essentially no time component other than the time at which the event is received. Thus, when such events are recorded, they are simply linked to a point in time in any audio or audio-visual recording. Other events include a time component, such as a time-and-position-based movement of a pointer within a window or in making a doodle or hand-written note. Such events, when recorded, may include recordation of the time component in synch with the time component of any audio and/or audiovisual data. In this way, the timing of events during playback will match the timing of events during recording of the session.

Of course, in some instances during the recording of events and the recording of audio and/or audiovisual data, there may be no events recorded and essentially no audio/audiovisual data. For example, the user recording a session may pause and think, even for an extended period of time. Such periods of no input may be handled in any of a variety of ways. For example, in some instances, the system may intelligently monitor the audio input and the input of events or other data, and may detect when no events and no or essentially no audio input is being received, and may discontinue recording until an event and/or audio is detected again. Alternatively, the system may continue recording, but may later excise periods of time where no activity occurred. Alternatively, the recording user or the playback user may opt to edit or skip over those periods of inactivity. Alternatively, the system may discontinue recording but maintain a timer reflective of how much time passed between cessation and reactivation of activity. These are merely examples of methods of dealing with inactivity during recording, and other methods may be used. It will be appreciated that "inactivity" in this sense reflects a lack of reception of events and a lack of reception of meaningful audio and/or audiovisual data.

Periods of inactivity may be reflected as desired at the time of playback as well. If periods of inactivity are present in the recording, the playback user may opt to skip over such periods. Alternatively, where recording continued during periods of inactivity as determined by the system, the playback user may opt to view/listen to such periods in case the system improperly determined, for example, that no meaningful audio activity was occurring, when meaningful activity was occurring, just quietly.

Recorded sessions and playback may be modified in other ways to facilitate the users' experience. For example, the recorded session may optionally be edited by the recording or even the playback user if desired. Because the events and information is recorded using native data where possible, such editing may be essentially seamless. On playback, the user can pause, speed up, slow down, or otherwise modify playback as desired to enhance the user's experience. Where files are opened or web pages visited during a recording, the system or program may monitor the opening and/or download of information to determine whether the user paused to let the file open or the page download. If so, the playback system or program may similarly monitor the opening of files and download of information such that playback may be temporarily interrupted to ensure that any necessary information is visible and accessible so that playback occurs as intended.

In at least some embodiments of the invention, playback may occur utilizing some or all of the native elements or the original recorded session, and the native elements may be interacted with natively. If a recorded session is a class, and a student participates in the class by viewing the recorded session, the student may opt to further participate by inserting a question into the recording, and the question is also recorded in its native format. The professor may be notified that the recorded session has been modified, and may view the recorded session or the modified portion thereof, and may insert a response to the question. The students of the class may also be notified of modifications by either or both of other students and the professor. In any event, any modifications to the recorded session are recorded using common and native elements.

In at least some embodiments of the invention, sections of the recorded sessions may be tagged for convenience in interacting with the recorded sessions. Tagging may provide users with options, for example, to re order the recorded sessions in different ways. For example, a user in a meeting way wish to recall only the pieces where a particular individual spoke, and can recreate that from the tagged info. Alternatively, tags can be used as navigation points to quickly move through a recorded session to a point of particular interest. Tags may be implemented to tag speech acts such as offers, declarations, assessments, and the like. In some instances, tagging may be automatic or semi-automatically provided. In other instances, tagging may be manually performed at the time of recording a session or afterward as desired.

Figure 4:
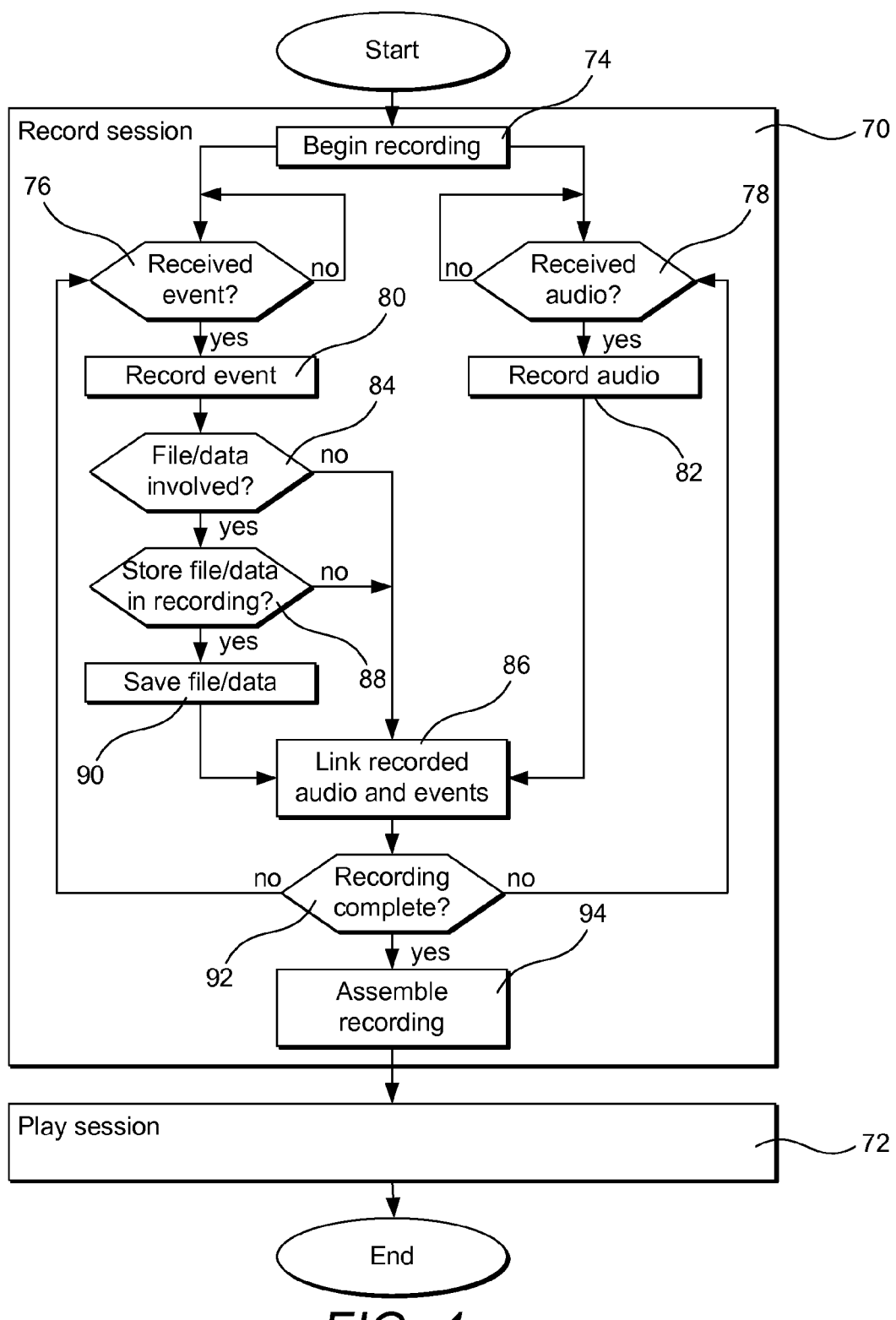
FIG. 4 shows a flowchart illustrating methods in accordance with embodiments of the invention.
Figure 5:
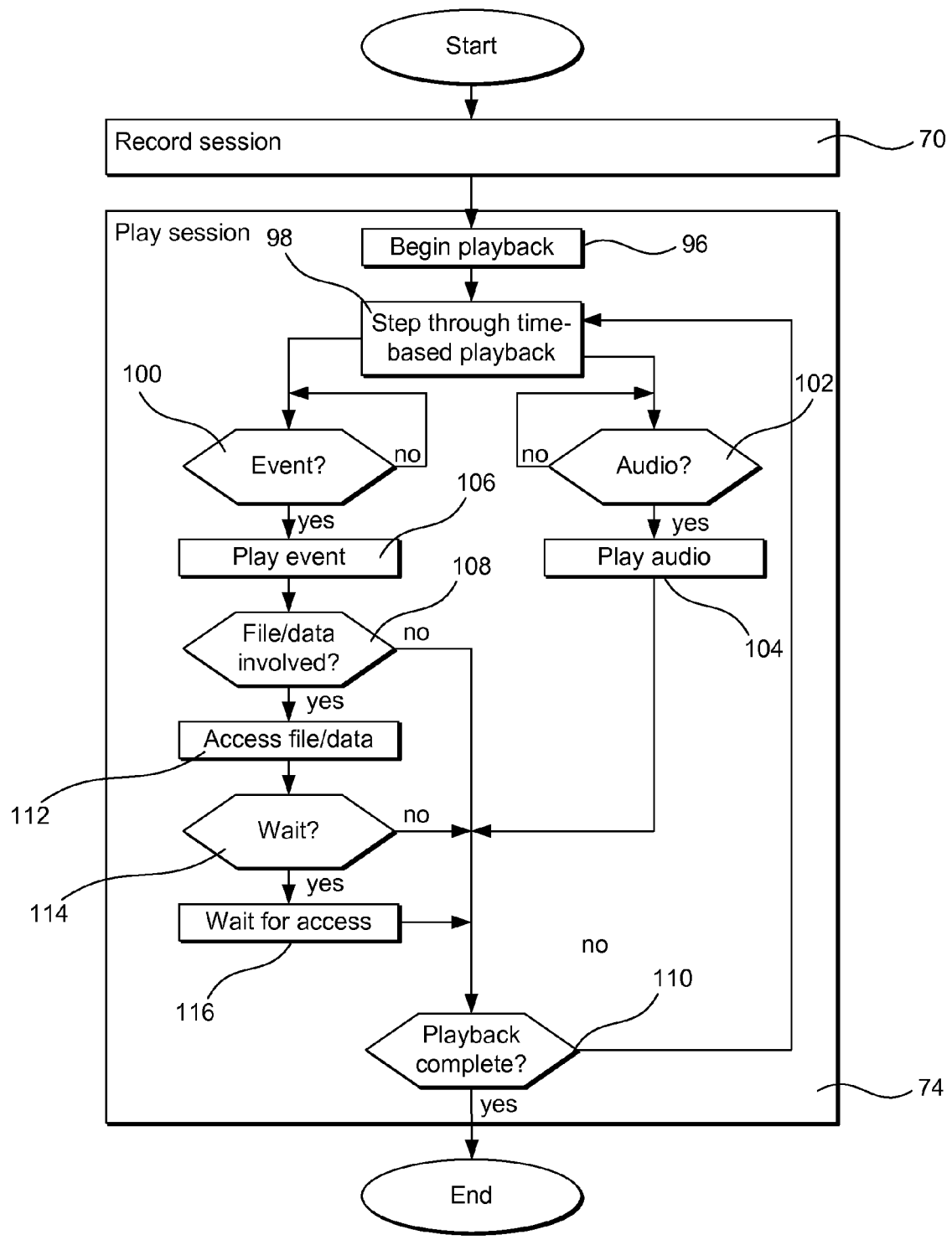
FIG. 5 shows a flowchart illustrating methods in accordance with embodiments of the invention.

In accordance with the foregoing, FIGS. 4 and 5 illustrate methods illustrative of certain embodiments of the invention. It will be understood that it is impossible to illustrate in FIGS. 4 and 5 all aspects of all features of the various embodiments of the invention and that FIGS. 4 and 5 and the accompanying discussion are intended only to be illustrative of concepts discussed herein. As illustrated in FIGS. 4 and 5, the methods may be conceptually separated into two main steps or stages, one of recording a session 70, and one of playing a session back 72. These two steps may occur separately from one another in time, place, and user system (indeed, as discussed above, even some of the recording steps or some of the playback steps may be separated in time, place, and system if desired), and the accompanying software and hardware may be adapted for use with each individual computer system and device. Regardless of the particular system and accompanying hardware and software, the experience of the user during recording 70 will be similar to the experience of the user during playback 72. Similarly, the experience of the user, either during recording 70 or during playback 72 may potentially be platform independent such that the user experience is largely or essentially identical, regardless of the platform, OS, hardware, etc. used. This platform independence is facilitated by the use of native formats as discussed herein.

As shown in FIG. 4, execution on the recording side begins at step 74, where recording of a session begins. It should be appreciated that certain actions may be taken prior to the initiation of recording of a session at step 74. For example, a user may opt to begin recording of a session at any point in time, including before or after completion of any initial steps desired by the user. The user may, for example wish to prepare images, text, strokes, drawings and doodles, files, programs, or any combination thereof, before initiating a recorded session. Such preparations may be utilized to craft the experience of the recorded session, such as by limiting wasted time, eliminating recording of unnecessary actions, or for any other reason. Thus, at time zero when recording of the session begins, the system may have any number of resources, documents, programs, and the like available to the user's use during recording.

Once recording of the session begins, recording of events (shown to the left) and (in this example) audio information (shown to the right) begins and continues simultaneously. At decision block 76, a determination is made as to whether an event has been received that is to be recorded. If no, execution loops back at this point until an event is received. Simultaneously, at decision block 78, a determination is made as to whether audio has been received. In at least some embodiments, this determination defaults to yes, but if only selective audio recording is being done and no audio is received, execution loops back at this point. When an event is received, it is recorded at step 80, and when audio is received, it is recorded at step 82. The recordation of events and audio occurs using any of the methods and mechanisms discussed above. While FIG. 4 shows a process whereby the system checks for events and records events when an event is received, it should be understood that this is shown for illustrative and discussion purposes only, and other methods may be used, including methods that minimize the use of computer resources. For example, the reception of events may itself trigger the system to record the events such that the system waits for events and reacts to them.

After an event is recorded at step 80, execution proceeds to decision block 84, where a determination is made as to whether the event involves a file or data that may potentially need to be stored for use in playback. If not, execution proceeds to step 86, where any recorded events and recorded audio are linked or synchronized such that they will be properly executed and provided during playback. If, however, the recorded event involves a file or data (e.g. opening or interacting with a file, web page, etc.), execution proceeds to decision block 88, where a determination is made as to whether the file/data is to be stored in the recording. The file or data might not be stored, for example, if it is determined that the file or data will otherwise be available during playback as discussed above. Similarly, the file or data might not be stored if it was previously restored with respect to a prior event. Thus, if the file or data is not to be stored in conjunction with this event, execution proceeds to step 86 as discussed above.

If, however, the file or data is to be stored for use in playback, execution proceeds to step 90, where the file or data is saved. As discussed previously, the file or data is saved in a way that facilitates later playback. Where possible, the file or data is saved in a native format. Additionally or alternatively, such as where it is anticipated that a program suitable for accessing the stored data or file will not be available, the use of static or video captures may be used. Regardless, embodiments of the invention strive to minimize the amount of data stored and further strive to maximize access to native data and files where possible when step 90 is executed. After the file or data is saved, execution proceeds to step 86 as discussed previously.

Regardless of whether a file or data is involved and regardless of whether that file or data is saved in conjunction with a recorded event, after the recorded event and audio information is linked at step 86, execution proceeds to decision block 92. At decision block 92, a determination is made as to whether recording of the session is complete. If not, execution loops back to decision blocks 76 and 78 for further/continued recording of events and audio. If, however, recording is complete, execution proceeds to step 94, where the recorded session is assembled. As discussed previously, this may involve the assembling of all saved data and files into a single directory or into a single bundled file package. The recorded session is then ready for playback in stage 72 as mentioned previously.

As shown in FIG. 5, execution on the playback side begins at step 96, where playback begins. Playback also proceeds with simultaneous playback of recorded events and recorded audio; however, playback occurs by stepping through the recording in a timewise fashion at step 98 and determining if there are any events and or audio information, or portions thereof, to play back at each interval of time. Thus, at each point of time of interest or interval of time of interest, execution proceeds simultaneously to decision block 100 for a determination of whether a recorded event exists to be played back and to decision block 102 for a determination of whether recorded audio exists to be played back. If recorded audio exists, it or the time-relevant portion thereof is played back at step 104. Similarly, if an event or portion thereof exists to be played back, it is played back at step 106.

In certain instances, it may be desirable in some instances to introduce certain audio or visual elements that were not received by the system as part of the original recording of a session. The introduction of such elements may facilitate user understanding of the session recording. For example, if a recorded session includes the receipt of small-scale strokes, drawings, or doodles, it may be difficult for a viewing user to always note such events. Thus, the system may add audio or visual elements to highlight events. One way this could occur, for example is by adding a highlight or halo around received touch-based events. Thus, even if only a small dot is added to the view by a touch event, its corresponding highlighted halo would make it easily detected and noted by the viewing user. Similarly, sounds could be added to certain events that might otherwise be too subtle to be noticed. Any audio or visual cue to make detection of an event on playback may be used, and such cues may be automatically added or may be added as desired by a user such as a user originally making the recording.

The playback of the event or portion thereof may involve the accessing or use of a file or of data, and therefore execution proceeds to decision block 108 where a determination is made as to whether event playback involves a file or data. If no, execution proceeds to decision block 110 where a determination is made as to whether playback is complete, as will be discussed below. If a file or data is to be accessed (the result of the determination at decision block 108 is yes), execution proceeds to step 112, where the file or data that is involved is accessed in any relevant way. Because the accessing of the file or data may take some time and the access time may differ from the access time encountered at the recording stage, execution proceeds to decision block 114. At decision block 114, a determination is made as to whether to wait for access to the file or data to be completed before continuing playback. If yes, execution proceeds to step 116 For example, if a web site is to be accessed, the system may wait until access is complete or substantially complete before continuing playback. As another example, if a file is to be accessed that requires loading of a program to provide access to the file (e.g. a word processing program, a spreadsheet authoring program, etc.), the system may wait until the accessing program is loaded and the file is ready in the accessing program.

If there is no needed delay or after the requisite delay has passed, execution proceeds to decision block 110 as indicated previously. At this decision block 110, a determination is made as to whether playback has completed. If not, execution loops back for continued playback, stepping on through time for continued audio and event playback. If, however, playback is complete, execution ends.

The steps and methods illustrated with respect to FIGS. 4 and 5 are intended to be merely illustrative and are not exclusive of the features and embodiments of the invention discussed herein. For example, embodiments of the invention embrace the ability to pause one or more of recording and playback, although such ability is not illustrated in FIG. 4 or 5. Similarly, at least some embodiments of the invention embrace the ability to edit recorded sessions, including the ability to edit recorded sessions during playback as discussed above. While specific editing steps are not illustrated in FIGS.

4 and 74, the steps necessary to accomplish such editing will be apparent from the foregoing discussion and from the steps specifically illustrated in FIGS. 4 and 5.

Thus, while FIGS. 4 and 5 illustrate by way of flow chart processes associated with one embodiment of recording and replay of sessions, it is to be understood that alternative processes may be used and that alternative illustrations of such processes could have been used. As an alternative mode of conceptualizing at least some methods in accordance with embodiments of the invention, recording embraces three recording processes that have independent but related times. The first is the recording of audio (which will be the one that defines the playback of the session) and has the ability to pause the session. The second is the recording of events made by interacting with the screen or other features of the computer device involved in recording the session, (which may be recorded continuously and may be aggregated, for example, when audio time is paused). The third one is the background file/files been used in the session (these again may follow the sequence in which they were used when the voice was active).

Figure 6:
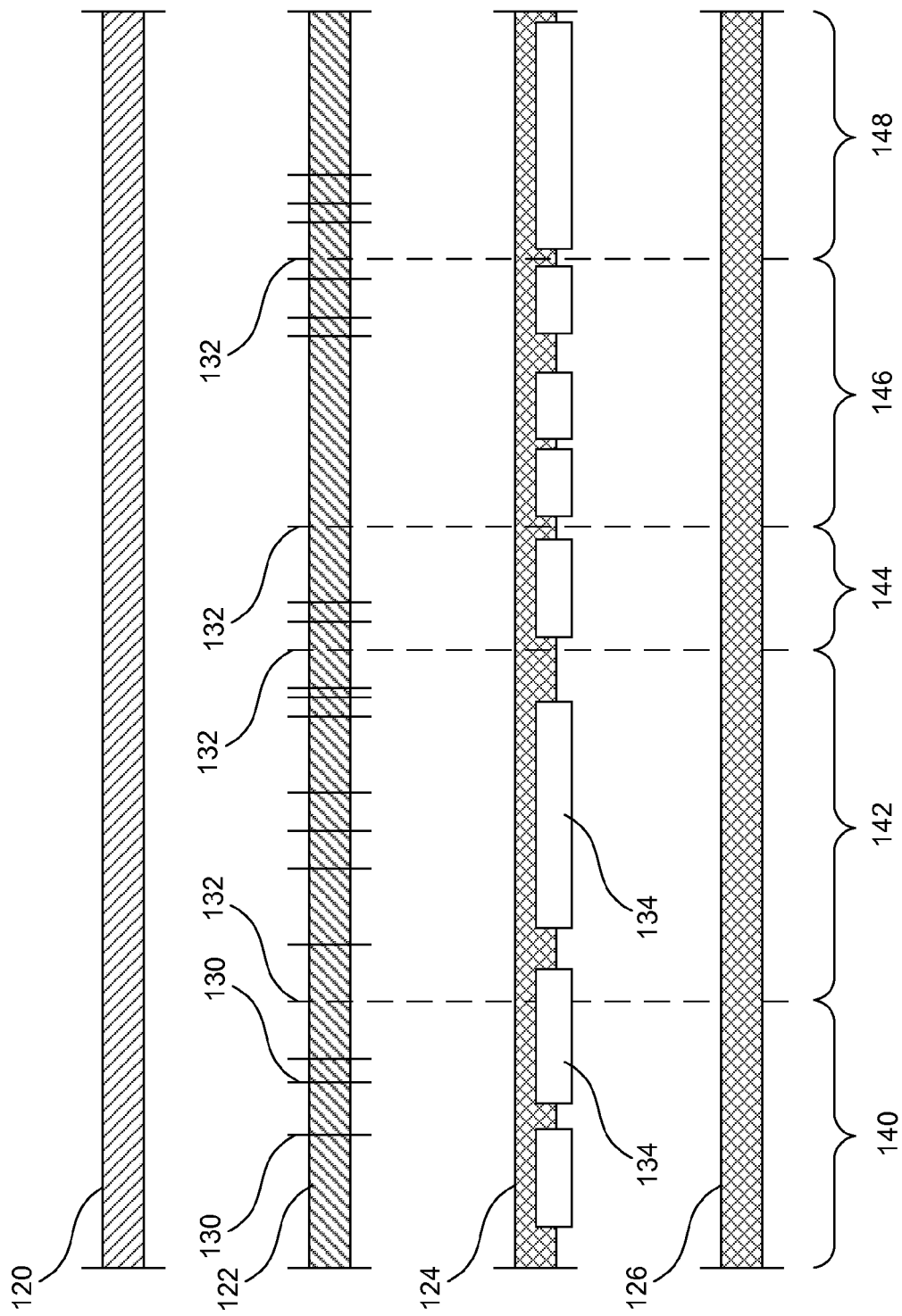
FIG. 6 shows various timelines illustrating features of embodiments of the invention.

FIG. 6 illustrates this concept in timeline fashion. A recorded session, illustrated as timeline 120 may be considered to include and be composed of three separate timelines, an event timeline 122, an audio timeline 124, and a background file timeline 126, each illustrated separately below the recorded session timeline 120. As may be seen on the events timeline 122, a series of actions 130 are recorded and stored as discussed herein, such as in a native format so as to minimize the amount of data required for storing and transmitting the recorded session. As illustrated, certain of the actions 130 may include accessing or otherwise displaying a different background file or view of a background file, thus representing an interaction with the background file timeline 126. These background access events 132 thus may represent a significant modification of the display at the time of the background access events 132. As another example, one or more of the background access events 132 may represent a clearing of the display to re-show the background file without any annotations or additions that had been made since the previous background access event 132. In comparison to a standard slide presentation, the background access events 132 may correspond to a changing of a slide.

The audio timeline 124 may include periods of interest 134 corresponding to periods of time where audio of interest was recorded during recording of a session (and separated by periods of silence or relative silence). As the user recording a session may continue to speak during background access events 132, the periods of interest 134 of the audio timeline 124 may or may not strictly correspond to the background access events 132. That is to say that a period of interest 134 may extend through a background access event 132 and thus include audio information both before and after a background access event 132, as shown in FIG. 6. Regardless, the background access events 132 may be considered natural breaking points of the recorded session, such that the recorded session might be deemed to be divided into segments, marked as segment 140, segment 142, segment 144, segment 146, and segment 148 in the illustrated example.

The separation of the recorded session into various timelines and components in this fashion permits various additional interactions with the recorded session. For example, it can be desirable to make a recorded session as professional as possible. Thus, it may be desirable to have a professional voice actor perform a narration to accompany a recorded session when the recorded session is to be played back later. This can easily be done by recording a session, separately having a professional voice actor record a narration, and then replacing the audio portion of the recorded session (e.g. the audio timeline 24) with the professional narration. As may be appreciated, the exact timing of the professional narration may not exactly correspond to the original audio created when the session was originally recorded. Thus, the professional narration might not perfectly match up with the actions 130 and/or background access events 132 as originally recorded.

This is easily rectified, however, as the actions 130 and background access events 132 as originally recorded are stored in a native format and can easily be adjusted along the events timeline 122 to match locations in the professional narration corresponding to the original locations in the audio timeline 124. The mixing of the new audio timeline 124 and the modified events timeline 122 (and corresponding modification of the background file timeline 126) may at times result in a recorded session that is either shorter or longer than the original recorded session, but this modification is easily achieved without complex and computer-intensive video editing, as the spacing and timing of actions 130 and background access events 132 is essentially all that needs to be changed.

Just as the quality and professionalism of a recorded session can be enhanced by using a professional narration, the quality and professionalism of a recorded session could be enhanced by using a professional recreation of the various actions 130 contained on the events timeline 122. For example, one recording user might find that other users are confused by some of his input actions 130, such as due to bad handwriting (in the case of hand-written inputs received, for example, through a touch screen or other similar interface), or possibly due to a misplaced and recorded input. A user with more skill in conveying information according to the recorded input could recreate one or more of the various actions 130 contained on the events timeline 122, and any selection of the recreated actions 130, including the entire events timeline 122, could replace the originally recorded actions 130 to improve the quality of the recorded session.

Selectively replacing or modifying part or all of one or both of the events timeline 122 or the audio timeline 124 in this fashion allows for the creation of professional-quality recorded sessions for any of a variety of purposes. For example, a user may desire a recorded session of high quality for purposes of a business proposal or presentation. Alternatively, a user might desire a high quality recorded session when the recorded session is to be used as a training tool for using a company's software or for any other training purpose. Or a user might simply wish to present him or herself in the best light possible, for whatever reason.

Just as the actions 130 recorded on the events timeline 122 and the audio recorded on the audio timeline 124 can be modified, the background files accessed by the background access events 132 can be modified to create a different or enhanced recorded session. For example, a user might create a recorded session intended to be used as a training tool for using software under development. The user might use background files relating to the then-current pre-release version of the software in creating the recorded session; however, prior to release of the software, one of the views of the software might be modified such that the recorded session as originally recorded includes a view that was modified for the actual release of the software. The user could modify the background access event 132 corresponding to that view to refer to the new view, and could also modify any actions 130 impacted by the change. This is easily accomplished without requiring that the whole recorded session be re-recorded. Modifications along the lines discussed herein are easily achieved without requiring complete recreation of the recorded session and without requiring perfection in both the audio and actions 130 within a single recording "take" of the session.

In addition to the various forms of editing, annotating, and modifying of recorded sessions discussed previously, a recorded session can also be modified to create new content. For example, a recorded session serving as a presentation might function well at a twenty minute length in some circumstances, but might need to be trimmed to ten minutes for other situations. Rather than create an entirely new recorded session, the user might simply desire to remove one or more of the segments contained in the original recorded session. The remaining segments can then be played in any desired order to create the new recorded session.

This can be illustrated using the example of FIG. 6. Suppose, for example, that the user wishes to retain segment 140, segment 144, and segment 148 in a shortened recorded timeline. The user would thus discard recorded segments 142 and 146. Although these segments are separated by background access events 132, the segments could also be separated by any other relevant action 130, period of time, etc. As may be seen in FIG. 6, one of the background access events 132 separates each of the sequential segments.

As may also be seen in FIG. 6, the background access event 132 separating segment 140 from segment 142 also divides a period of interest 134 contained on the audio timeline 124. In some instances, the new recorded session may be assembled by simply slicing the various timelines at the selected locations (such as the background access events 132) regardless of whether a portion of audio might be cut off mid-sentence or mid-word and by assembling the new recorded session from the selected segments. Alternatively, the new recorded session may be assembled more selectively by slicing the various timelines at different locations and adding additional time to certain timelines to account for discrepancies.

Figure 7:
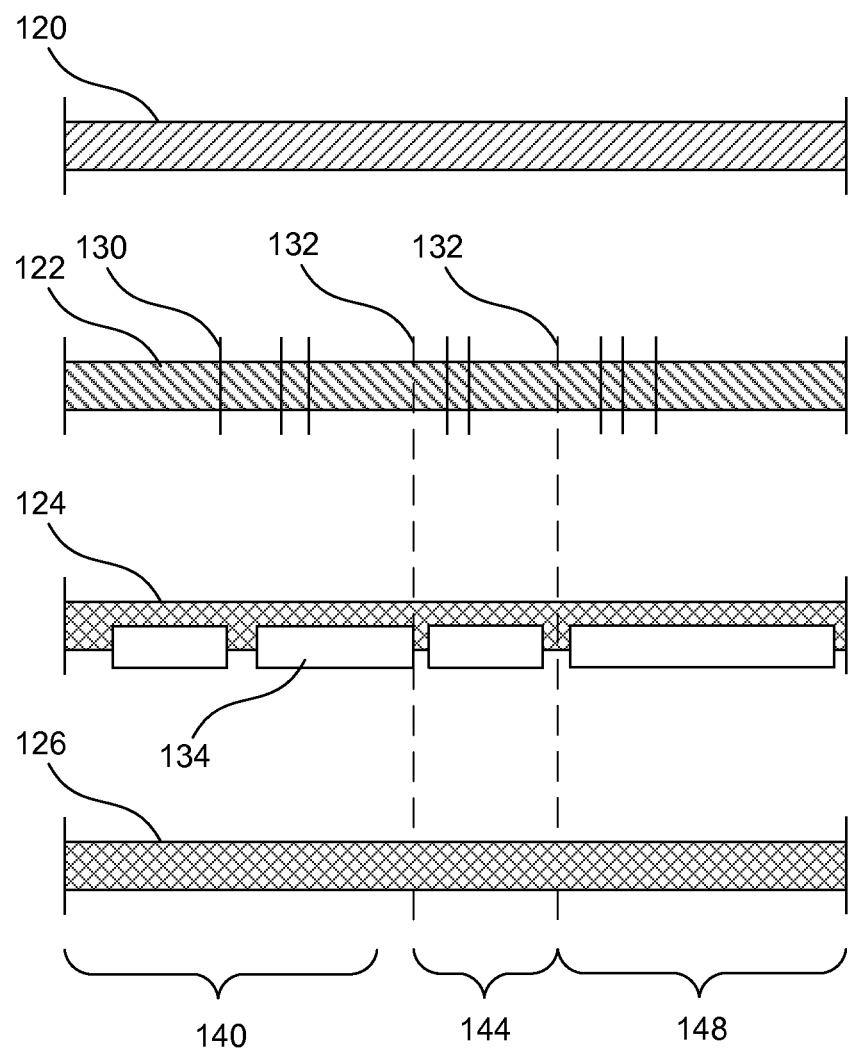
FIG. 7 shows various edited timelines in accordance with embodiments of the invention.

FIG. 7 illustrates a new recorded session and its component timelines using such a procedure. In this example, the period of interest 134 that extended through the background access event 132 separating segment 140 from segment 142 has been retained in its entirety, and a short period of time has been added to the events timeline 122 and the background file timeline 126 so that the subsequent actions 130 and background access events 132 remain synchronized with the subsequent audio without losing a portion of the period of interest 134. Thus, the new recorded session contains all of segment 140, segment 144, and segment 148, along with a small additional portion of the audio of segment 142. The option to retain this additional segment of audio may be selected by the recording user, the playback user, or it may be automatically selected by the system according to various rules and/or algorithms.

As may be appreciated from the foregoing description, the editing of recorded sessions to create new sessions from various segments may be easily performed simply by including and discarding various segments of audio, certain actions 130 and background access events 132, and certain background files. In some instances, a new recorded session is created and the old recorded session remains intact and available for viewing or for creating other modified recorded sessions. Indeed, as the data for the new recorded session is almost entirely contained in the original recorded session with only very minor additional data included to indicate how the original should be sliced and reassembled for playback, the modified recorded session can be easily transmitted together with the original with very little additional data transfer capacity or transmission delay involved.

Because the action information is maintained in native data and recorded audio as discussed herein the act of creating new recorded sessions in this fashion can be extraordinarily easy from the point of view of the editing user. Indeed, a system may display a recorded session for editing as a series of slides corresponding to the various segments. The user could simply select the segments to be included or excluded (such as by clicking on radio buttons or the like, or any other selection mechanism known in the art), and with a few clicks a new recorded session could be rapidly created. If desired, options could even be provided to reorder segments from the recorded session and/or to import segments from other recorded sessions into the new session. Thus, embodiments of the invention provide maximum flexibility and ease of use in recording sessions, modifying and annotating the recorded sessions, and distributing the various recorded sessions with minimal data requirements.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A non-transitory computer-readable medium containing computer program code for executing a method for recording a computer-based session comprising events and accompanying audio information, the method comprising:
   recording an event received at a computer device, the event being recorded in a format that does not involve a video screen shot of the event, the recorded event comprising an event selected from the group consisting of:
   movement of a pointing device;
   selection of an element or file by a pointing device;
   activation of a file;
   opening of a file;
   saving of a file;
   switching between windows displayed by the computer device;
   modifying the size or relationship of one or more windows;
   opening one or more windows;
   closing one or more windows;
   opening a webpage using a browser;
   viewing a webpage using a browser;
   interacting with a webpage using a browser; and
   selecting a link of a webpage using a browser;
   recording audio information received at the computer device by a microphone, the audio information being received in temporal proximity to the event; and
   storing the recorded event and the recorded audio information as a recorded session for later reproduction of the event and the recorded audio information;
   wherein the recorded event is one of a plurality of events recorded at the computer device, each of the plurality of events being linked to a point in time in the recorded audio information in the recorded session.

2. A non-transitory computer-readable medium as recited in claim 1, where the method further comprises:
   determining that the recorded event involves accessing a file or data; and
   making a determination as to whether to store the accessed file or data with the recorded event in the recorded session.

3. A non-transitory computer-readable medium as recited in claim 2, wherein the method further comprises storing the accessed file or data with the recorded session.

4. A non-transitory computer-readable medium as recited in claim 3, wherein the method further comprises making a determination as to a state of the file or data to be stored with the recorded session.

5. A non-transitory computer-readable medium as recited in claim 4, wherein the state of the file or data to be stored with the recorded session comprises one of:
 a state of the file or data as of the initiation of the recorded session;
 a state of the file or data as of the termination of the recorded session; and
 a state of the file or data as of an intermediate point in time between the initiation and the termination of the recorded session.

6. A non-transitory computer-readable medium as recited in claim 1, where in the method further comprises:
 receiving an indication that a portion of the session is to be recorded with video screen shot information; and
 storing video screen shot information of the computer device with the recorded session during a period of time indicated with the indication that a portion of the session is to be recorded with video screen shot information.

7. A non-transitory computer-readable medium as recited in claim 1, wherein the event is recorded as native data such that upon playback of the recorded session, the recorded event can be replayed at a playback device such that the recorded event is recreated at the playback device.

8. A non-transitory computer-readable medium as recited in claim 1, wherein the method further comprises tagging a portion of the recorded session to facilitate interaction with the recorded session.

9. A non-transitory computer-readable medium as recited in claim 1, wherein the method further comprises:
 playing back at least a portion of the recorded session;
 receiving an input signaling an intent to append a new session to the recorded session;
 recording a new event received at a computer device;
 recording new audio information received at the computer device, the new audio information being received in temporal proximity to the new event;
 storing the recorded new event and the recorded new audio information as a separate new session; and
 appending the new session to the recorded session.

10. A non-transitory computer-readable medium as recited in claim 9, wherein the new session is recorded by a different user than a user who recorded the original recorded session at a point in time temporally separated from the time of recording of the original recorded session.

11. A non-transitory computer-readable medium containing computer program code for executing a method for recording a computer-based session comprising events and accompanying audio information, the method comprising:
 recording an event received at a computer device, the event being recorded in a format that does not involve a video screen shot of the event;
 recording audio information received at the computer device, the audio information being received in temporal proximity to the event; and
 storing the recorded event and the recorded audio information as a recorded session;
 wherein the recorded session comprises a plurality of recorded events, a recorded audio timeline, and a plurality of backgrounds, and wherein the method comprises:
 modifying the recorded session by taking an action selected from the group of:
  replacing a portion of the recorded events with new events, independent of the audio timeline and the backgrounds;
  replacing a portion of the audio timeline with a new audio portion, independent of the recorded events and the backgrounds; and
  replacing at least one of the backgrounds with a new background, independent of the recorded events and the audio timeline;
 evaluating the modified recorded session to determine whether an adjustment to timing of an unmodified portion of the recorded session is necessary to synchronize with any modification of the recorded session; and
 when an adjustment to timing of the unmodified portion is necessary, synchronizing the unmodified portion of the recorded session with any modification of the recorded session.

12. A non-transitory computer-readable medium containing computer program code for executing a method for recording a computer-based session comprising events and accompanying audio information, the method comprising:
 recording an event received at a computer device, the event being recorded in a format that does not involve a video screen shot of the event;
 recording audio information received at the computer device, the audio information being received in temporal proximity to the event; and
 storing the recorded event and the recorded audio information as a recorded session;
 wherein the recorded session comprises a plurality of recorded events, a recorded audio timeline, and a plurality of backgrounds, and wherein the method comprises:
 modifying the recorded session by selectively removing corresponding portions of the recorded events, the recorded audio timeline, and the backgrounds; and
 appending remaining portions of the recorded session together to form a new recorded session;
 wherein the recorded event is one of a plurality of events recorded at the computer device, each of the plurality of events being linked to a point in time in the recorded audio information in the recorded session.

13. A non-transitory computer-readable medium storing computer program code for executing a method for playing a recorded session comprising recorded audio and recorded events, the method comprising:
 accessing the recorded session;
 stepping through the recorded session in a time-based fashion while playing any audio information corresponding to a particular time;
 detecting a recorded event at a particular point in time, wherein the recorded event does not comprise a video screen shot of the recorded event, the recorded event comprising an event selected from the group consisting of:
  movement of a pointing device;
  selection of an element or file by a pointing device;
  activation of a file;
  opening of a file;
  saving of a file;
  switching between windows displayed by the computer device;
  modifying the size or relationship of one or more windows;
  opening one or more windows;

closing one or more windows;
opening a webpage using a browser;
viewing a webpage using a browser;
interacting with a webpage using a browser; and
selecting a link of a webpage using a browser; and playing back the recorded event in conjunction with any audio information corresponding in time to the recorded event, such that the recorded event is recreated on a playback device;

wherein the recorded event is one of a plurality of events recorded at the computer device, each of the plurality of events being linked to a point in time in the recorded audio information in the recorded session.

14. A non-transitory computer-readable medium as recited in claim 13, wherein the event comprises an access of a file or data, wherein the method further comprises:

initiating access of the file or data as directed by the event; and determining whether to interrupt playback of the recorded session to permit the playback device to fully access the file or data.

15. A non-transitory computer-readable medium as recited in claim 14, wherein the method further comprises interrupting playback of the recorded session to permit the playback device to fully access the file or data.

16. A non-transitory computer-readable medium as recited in claim 14, wherein the method further comprises allowing a user to pause playback of the recorded session and to interact with the file or data accessed in the recorded session.

17. A non-transitory computer-readable medium as recited in claim 16, wherein the method further comprises allowing a user to edit the recorded session to create a new recorded session.

18. A non-transitory computer-readable medium as recited in claim 17, wherein allowing the user to edit the recorded session to create a new recorded session comprises:

playing back at least a portion of the recorded session;

receiving an input signaling an intent to append a new session to the recorded session;

recording a new event received at a computer device;

recording new audio information received at the computer device, the new audio information being received in temporal proximity to the new event;

storing the recorded new event and the recorded new audio information as a separate new session; and appending the new session to the recorded session to create the new recorded session.

19. A non-transitory computer-readable medium as recited in claim 16, wherein the method further comprises allowing a user to save the file or data in its then-displayed format.

* * * * *